United States Patent
Guidati

(10) Patent No.: US 9,671,175 B2
(45) Date of Patent: Jun. 6, 2017

(54) SYSTEM FOR REVERSIBLY STORING ELECTRICAL ENERGY AS THERMAL ENERGY

(71) Applicant: General Electric Technology GmbH, Baden (CH)

(72) Inventor: Gianfranco Ludovico Guidati, Zurich (CH)

(73) Assignee: General Electric Technology GmbH, Baden (CH)

( * ) Notice: Subject to any disclaimer, the term of this patent is extended or adjusted under 35 U.S.C. 154(b) by 90 days.

(21) Appl. No.: 14/643,717

(22) Filed: Mar. 10, 2015

(65) Prior Publication Data
US 2015/0276326 A1 Oct. 1, 2015

(30) Foreign Application Priority Data
Apr. 1, 2014 (EP) .................................. 14163065

(51) Int. Cl.
*F01K 3/12* (2006.01)
*F28D 20/00* (2006.01)
*F25B 27/00* (2006.01)

(52) U.S. Cl.
CPC ............ *F28D 20/0043* (2013.01); *F01K 3/12* (2013.01); *F25B 27/00* (2013.01); *Y02E 60/145* (2013.01)

(58) Field of Classification Search
CPC ...... Y02E 60/14–60/147; F01K 25/10–25/106
USPC ............. 62/238.6, 238.7, 324.1; 60/643–681
See application file for complete search history.

(56) References Cited

U.S. PATENT DOCUMENTS

| | | | |
|---|---|---|---|
| 4,089,744 A | * | 5/1978 | Cahn .................. F01K 3/006 376/322 |
| 2011/0139407 A1 | | 6/2011 | Ohler et al. |
| 2012/0222423 A1 | | 9/2012 | Mercangoez et al. |
| 2014/0060051 A1 | * | 3/2014 | Ohler .................. F01K 3/12 60/652 |
| 2014/0102073 A1 | * | 4/2014 | Pang .................. F01K 3/00 60/39.182 |

(Continued)

FOREIGN PATENT DOCUMENTS

| | | |
|---|---|---|
| DE | 403683 C | 10/1924 |
| EP | 2 532 843 A1 | 12/2012 |

(Continued)

OTHER PUBLICATIONS

Extended European Search Report issued May 26, 2014, by the European Patent Office in corresponding European Patent Application No. 14163065.7-1610. (4 pages).

*Primary Examiner* — Laert Dounis
(74) *Attorney, Agent, or Firm* — GE Global Patent Operation; Rita D. Vacca

(57) ABSTRACT

A system for reversibly storing electrical energy as thermal energy. The system can include a reversible subcritical vapor-liquid cycle energy storage system with a single hot storage fluid tank and cold storage fluid tank that are inter connected by an inter storage tank flow path. The inter storage tank flow path includes an inter storage heat exchanger in the vapor-liquid cycle that enables sensible heat transfer between the working fluid and storage fluid as the storage fluid passes between the hot storage fluid tank and the cold storage fluid tank. This supplements latent heat transfer between the working fluid and the hot storage fluid tank and the cold storage fluid tank.

3 Claims, 2 Drawing Sheets

(56) References Cited

U.S. PATENT DOCUMENTS

2015/0218969 A1* 8/2015 Reznik ............... F01K 1/08
                                                                       60/651
2015/0260463 A1* 9/2015 Laughlin ............. F02C 1/10
                                                                       165/10
2016/0248299 A1* 8/2016 Ouvry ................. F01K 3/12

FOREIGN PATENT DOCUMENTS

| EP | 2 587 005 A1 | 5/2013 |
| EP | 2 602 443 A1 | 6/2013 |
| EP | 2 698 506 A1 | 2/2014 |
| JP | 57183504 A * | 11/1982 |
| WO | WO 2010/020480 A2 | 2/2010 |
| WO | WO 2011/045282 A2 | 4/2011 |

* cited by examiner

SYSTEM FOR REVERSIBLY STORING ELECTRICAL ENERGY AS THERMAL ENERGY

TECHNICAL FIELD

The present disclosure relates generally to pumped heat electrical storage and more specifically to subcritical vapour-liquid storage cycles.

BACKGROUND INFORMATION

Further penetration of fluctuating renewable energy production requires economic solutions for bulk electricity storage. Today's leading technology is Pumped Hydro Storage (PHS). A possible alternative is Compressed Air Energy Storage (CAES). Whilst PHS requires the right topography i.e. mountains, CAES relies on the presence of specific geological underground structures, such as salt caverns. Other forms of energy storage include batteries and flywheels.

Pumped Heat Electricity Storage (PHES) is an alternative storage technique to both PHS and CAES. During charging a PHES system pumps heat from a low temperature reservoir to a high temperature reservoir, it therefore operates as a heat pump. During discharging the high temperature heat is used to drive a power cycle whilst the residual heat is rejected into the low temperature reservoir. The obvious advantage of such a system is that the electricity is stored only under the form of heat or thermal energy, i.e. it requires only some kind of thermally isolated containment that is independent of geology or topography.

An example of a PHES system is described in EP 2602443. This system may be described as a reversible heat pump. During charging of electricity, a compressor is operated within a heat pump cycle. Heat is absorbed from the ambient and passed to high temperature thermal energy storage (TES). High efficiency is achieved by choosing the upper pressure level of the thermodynamic cycle to be super critical. This allows the transfer of high temperature heat, at nearly constant working fluid heat capacity, to a storage medium such as molten salt that also has a near constant heat capacity.

The disadvantage of supercritical systems is the required high cycle pressures and temperatures in conjunction with the typical need for an organic fluid such as propane or butane that is flammable. These security issues make it difficult to deploy such a system in a domestic situation. Furthermore the cycle is complex to operate, mainly due to the presence of two recuperators and two TES.

German patent 403683 describes an alternative process based on a subcritical cycle which utilities during the discharging cycle heat from water that is available in the environment. The environmental water may be additionally be used to cool condensed working fluid during the charging cycle before throttling and evaporation. The purpose of this is the same namely to reduce irreversibility and thus improve efficiency. However, since the temperature of typical water from the environment will be much smaller than the peak temperature in the hot tank this solution only provides a partial improvement.

Some of drawbacks are at least partially mitigated by the thermoelectric energy storage system described in WO 2010/020480 A2. This solution uses a heat exchanger to transfer thermal energy between a condensable working fluid and a sensible heat thermal storage medium circulating between cold and hot storage tanks. Thermal energy is transferred from the working fluid to the thermal storage medium during a charging cycle and is transferred from the thermal storage medium to the working fluid during a discharging cycle in which electrical energy is generated by expansion of the heated working fluid in a turbine. The condensable working fluid is heated and compressed to a supercritical state during both the charging and discharging cycles and this maximises the round-trip electrical efficiency of the system.

Round-trip electrical efficiency is increased further in the thermoelectric energy storage system described in WO 2011/045282 A2 due to the provision of an internal heat exchanger. The internal heat exchanger preheats the working fluid during both the charging and discharging cycles, thereby maximising system efficiency.

There, however, remains a need for an improved thermal energy storage system which achieves a high round-trip electrical efficiency with minimal capital expenditure.

SUMMARY

A reversible subcritical vapour-liquid cycle energy storage system is disclosed that provides a high efficiency cycle which provides a simplified alternative other supercritical systems.

It attempts to addresses this problem by means of the subject matters of the independent claims.

The disclosure is based on the general idea of a subcritical cycle utilizing a connection between hot and cold thermal storage tanks to remove and store sensible heat of the working fluid. In this way the thermal efficiency of the cycle is improved.

An aspect provides a system for storing electrical energy as thermal energy comprising a reversible subcritical vapour-liquid cycle having a working fluid flow path, a hot storage fluid flow path and a cold storage fluid flow path. The working fluid flow path includes a hot storage fluid heat exchanger configured and arranged to exchange thermal energy between the working fluid, as it changes phase, and a hot storage fluid. A vapour pressure changing apparatus configured to change the pressure of the working fluid in the vapour phase and additionally arranged fluidly adjacent the hot storage fluid heat exchanger. Further a cold storage fluid heat exchanger, fluidly adjacent the vapour pressure changing apparatus is configured and arranged to exchange thermal energy between the working fluid, as it changes phase, and a cold storage fluid. A liquid pressure changing apparatus, fluidly adjacent the cold storage fluid heat exchanger is configured to change the pressure of a liquid phase of the working fluid. Additionally, an inter storage heat exchanger, located fluidly between the pressure changing apparatus and the hot storage fluid heat exchanger is configured and arranged to exchange sensible heat of the working fluid with a storage fluid. The hot storage fluid flow path passes through the hot storage fluid heat exchanger and a hot storage fluid tank for storing the hot storage fluid while the a cold storage fluid flow path passes through the cold storage fluid heat exchanger and a cold storage fluid tank for storing the cold storage fluid. The system further includes an inter storage flow path that fluidly connects the hot storage fluid tank to the cold storage fluid tank via the inter storage heat exchanger this enabling the storage of sensible heat of the working fluid.

A further aspect provides a method for generating electrical energy from thermal storage. The method includes the steps of evaporating, expanding, condensing pressuring and heating the working fluid. The evaporation step involves evaporation against a hot storage fluid circulating through a hot storage fluid heat exchanger and a hot storage fluid tank. The expansion step involves expanding the evaporated working fluid in a turbine of the vapour-liquid cycle so as to drive a generator so by generating electricity. The condensing step involves condensing the expanded working fluid in a cold storage fluid heat exchanger against a cold storage fluid circulating through the cold storage fluid heat exchanger and a cold storage fluid tank. The pressuring step involves pressuring the condensed working fluid in a pump, while the heating step involves heating the pressured working fluid in an inter storage heat exchanger against a storage fluid passing from the hot storage fluid tank to the cold storage fluid tank before evaporating the working fluid in the evaporator.

A further aspect provides a method for storing electrical energy as thermal energy. The method includes the steps of isenthalpic throttling, evaporating, compressing, condensing and cooling of a working fluid of a vapour-liquid cycle. The isenthalpic throttling involves isenthalpically throttling the working fluid using a throttle valve. The evaporating step involves evaporating the throttled working fluid is cold storage fluid heat exchanger against a cold storage fluid circulating through the cold storage fluid heat exchanger and a cold storage fluid tank. The compression step involves compressing the evaporated working fluid in a compressor driven by a motor thereby inputting electrical energy in the vapour-liquid cycle. The condensing step involves condensing the compressed working fluid in an hot storage fluid heat exchanger against a hot storage fluid circulating through the hot storage fluid heat exchanger and a hot storage fluid tank, while the cooling step involves cooling the condensed working fluid in an inter storage heat exchanger against a storage fluid passing from the cold storage fluid tank to the hot storage fluid tank before the working fluid is throttled.

It is a further object of the invention to overcome or at least ameliorate the disadvantages and shortcomings of the prior art or provide a useful alternative.

Other aspects and advantages of the present disclosure will become apparent from the following description, taken in connection with the accompanying drawings which by way of example illustrate exemplary embodiments of the present invention

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
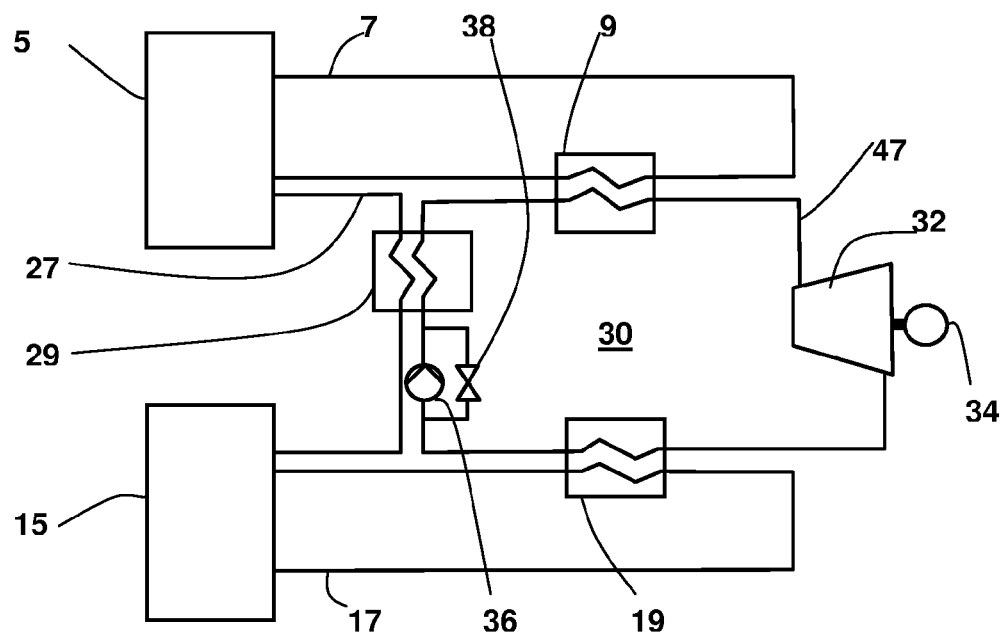
FIG. 1 is a schematic of an energy storage system according to an exemplary embodiment.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

FIG. 1 shows an exemplary embodiment of a system for storing electrical energy as thermal energy using a reversible subcritical vapour-compression cycle. The reversible subcritical vapour-compression cycle includes a working fluid flow path 47 that makes up a working fluid circuit 30, a hot storage fluid flow path 7, a cold storage fluid flow path 17 and an inter storage tank flow path 27 that connecting storage tanks 5,15 in the hot storage fluid flow path 7 to the cold storage fluid flow path 17 respectively.

In an exemplary embodiment shown in FIG. 1 the working fluid flow path 47 comprises as closed loop. A hot storage fluid heat exchanger 9 in the working fluid flow path is configured and arranged to transfer thermal energy of the working fluid as it changes phase to a hot storage fluid. A vapour phase pressure changing device 32, such as a compressor/turbine configured either as a single unit or as two separate units either provides electrical energy into the working fluid flow path 47 by means of a motor 34 when the vapour phase pressure changing device 32 operates as a compressor or release electrical energy from the working fluid flow path 47 by means of a generator when the vapour phase pressure changing device 32 operates as a turbine. A further cold storage fluid heat exchanger 19 utilised a further change in phase of the working fluid to exchange thermal energy with a cold storage fluid wherein the cold storage fluid heat exchanger 19 changes phase of the working fluid in the opposite direction to that of the hot storage fluid heat exchanger 9. A fluid liquid phase pressure changing device, comprising either a pump 36 or throttle valve 38 for isenthalpic throttling, depending on the direction of working fluid flow in the reversible cycle, changes the pressure of the of the working fluid while it is in the liquid phase. A further inter storage heat exchanger 29, within the working fluid flow path 47, is used as a sensible heat exchanger.

As shown in FIG. 1, an exemplary embodiment further includes a hot storage fluid tank 5 for storing a hot storage fluid a hot storage fluid flow path 7 that connects the hot storage fluid tank 5 to the hot storage fluid heat exchanger 9.

As shown in FIG. 1, an exemplary embodiment further includes a cold storage fluid tank 15 for storing a cold storage fluid and a cold storage fluid flow path 17 that connects the cold storage fluid tank 15 to the cold storage fluid heat exchanger 19.

As shown in FIG. 1 an exemplary embodiment further includes an inter storage tank flow path 27 that fluidly connects the hot storage fluid tank 5 to the cold storage fluid tank 15 via an inter storage heat exchanger 29.

The reversible cycle shown in FIG. 1 is operable in both a charging phase and a discharging phase.

Figure 2:
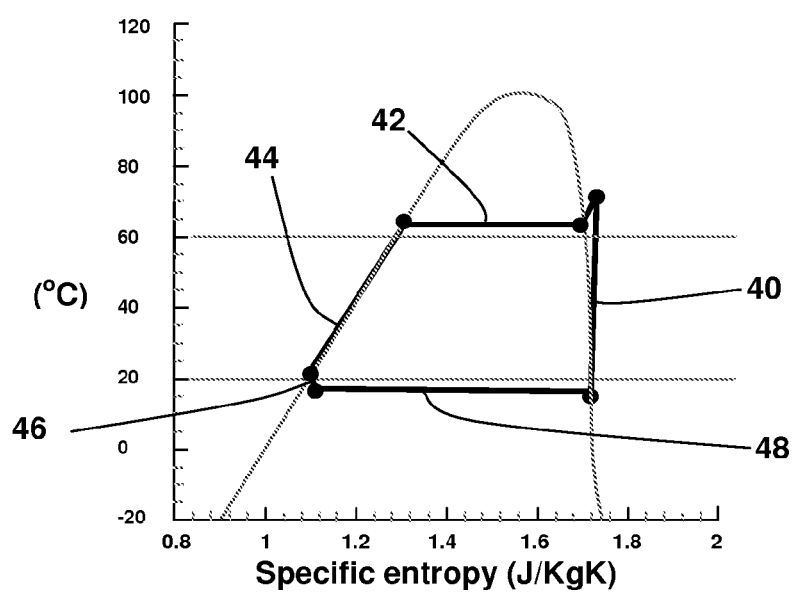
FIG. 2 is a temperature-entropy diagram of a charging cycle of the storage system of FIG. 1.

In the charging phase the reversible cycle operates as a heat pump in which electrical energy is converted into thermal energy stored in the hot storage fluid tank 5. The thermal cycle of this phase is shown in FIG. 2. After evaporation 48 against the cold storage fluid in the cold storage fluid heat exchanger 19 the working fluid is compressed 40 by the compressor 32 using electrical energy input from a motor 34. In this arrangement the cold storage fluid heat exchanger 19 is an evaporator. The thermal energy of this high pressure vapour is then stored by de-superheating and condensing 42 the vapour against the hot storage fluid in the hot storage fluid heat exchanger 9. In this arrangement the hot storage fluid heat exchanger 9 is a condenser. Sensible heat 44 of the liquid phase working fluid is then removed in an inter storage heat exchanger 29 against storage fluid transferred from the cold storage fluid tank 15 to the hot storage fluid tank 5 via the inter storage tank flow path 27. During the condensation step, to minimize entropy generation, it is preferable to maintain a small temperature difference across the hot storage fluid heat exchanger 9 by ensuring that the flow rate of storage fluid in the hot storage fluid flow path 7 is kept high. After cooling down, the working fluid is isenthalpically throttled 46 using a throttle valve 38 before being evaporated 48 in the cold storage fluid heat exchanger the working fluid absorbs heat from low temperature storage. Again, to be achieved minimum entropy generation it is preferable to maintain a small temperature difference across the cold storage fluid heat exchanger 19 by ensuring that the flow rate of storage fluid in the cold storage fluid flow path 17 is kept high.

In a configuration with one hot storage fluid tank 5 and one cold storage fluid tank 15 the need for high volumes storage fluid to achieve high flow rates through the Hot storage fluid heat exchanger 9 and the cold storage fluid heat exchanger 19 is respectively are avoided. Nonetheless, during the charging cycle, the temperature of the hot storage fluid tank 5 will rise while the temperature of the cold storage fluid tank 15 will fall.

The use of an inter storage fluid heat exchanger 29 has the advantage to storing sensible heat as well as latent heat. An the exemplary embodiment shown in FIG. 1 takes storage fluid from the cold storage fluid tank 15 to the hot storage fluid tank the portion of the sensible heat lays exactly between the high and low temperature condensation/evaporation parts of the working fluid cycle enabling optimum utilisation of sensible heat storage.

Figure 3:
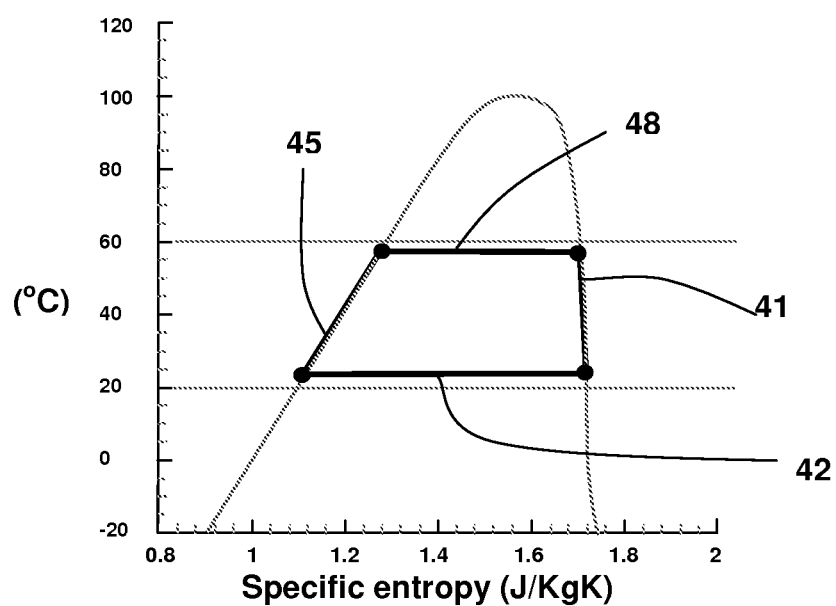
FIG. 3 is a temperature-entropy diagram of a dis-charge cycle of the storage system of FIG. 1.

During a dis-charging the cycle, as shown in FIG. 3 the charging process is reversed. A pump 36 increases the pressure of liquid phase working fluid. At first, the working fluid absorbs sensible heat 45 against storage fluid passing through the inter storage flow path 27 from the hot storage fluid tank 5 to the cold storage fluid tank 15 as it pass through the inter storage fluid heat exchanger 29. The working fluid is then evaporated 48 in the hot storage fluid heat exchanger 9 against hot storage fluid. In this arrangement the hot storage fluid heat exchanger 9 is an evaporator. As in the charging cycle, the hot storage fluid is circulated in the hot storage fluid flow path at a sufficient flow rate to lead to only a small temperature decrease across the hot storage fluid heat exchanger 9 before being fed back to the hot storage fluid tank 5. The now gaseous working fluid is expanded 41 in a turbine 32 and used to drive a generator 34. The cycle is closed by condensing the working fluid against cold storage fluid in a cold storage fluid heat exchanger 19. In this arrangement the cold storage fluid heat exchanger 19 is operated as a condenser. As the discharging process continues the hot storage fluid tank 5 cools down while the cold storage fluid tank 15 heats up. In addition, storage fluid passed from the hot storage fluid tank 5 to the cold storage fluid tank 15.

As a consequence of the irreversibility's of the cycle not all energy that was charged with the compressor can be discharged by the turbine. The remaining energy can be found in the tanks, as a higher temperature of either the hot tank or the cold tank. This heat has to be removed from the cycle, wherein the latter is only an option if the cold tank temperature is above any available heat rejection opportunity. The heat from the high temperature tank can be used for the purpose of room heating or warm water preparation.

As suitable storage fluid for described exemplary embodiments is water, nonetheless, other storage fluids matching required thermodynamic requires could be used.

Although the disclosure has been herein shown and described in what is conceived to be the most practical exemplary embodiment, it will be appreciated by those skilled in the art that the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS

5 Hot storage fluid tank
7 Hot storage fluid flow path
9 Hot storage fluid heat exchanger
15 Cold storage fluid tank
17 Cold storage fluid flow path
19 Cold storage fluid heat exchanger
27 Inter storage flow path
29 Inter storage heat exchanger
30 Working fluid flow circuit
32 Compressor/turbine
34 Motor/Generator
36 Pump
38 Expander valve
40 Compression
41 Expansion
42 Condensation, de-superheating
44 Sensible heat storage
45 Sensible heating
46 Sensible heat storage Isenthalpic throttle
47 Working fluid flow path
48 Evaporation

What is claimed is:

1. A system for reversibly storing electrical energy as thermal energy comprising:
   a reversible subcritical vapour-liquid cycle having a working fluid flow path cycling through
   a hot storage fluid heat exchanger configured and arranged to exchange thermal energy between a working fluid, as the working fluid changes phase, and a hot storage fluid,
   a vapour pressure changing apparatus configured to change pressure of the working fluid in a vapour phase and arranged between and fluidly adjacent the hot storage fluid heat exchanger and a cold storage fluid heat exchanger,
   the cold storage fluid heat exchanger arranged fluidly adjacent the vapour pressure changing apparatus, configured and arranged to exchange thermal energy between the working fluid, as the working fluid changes phase, and a cold storage fluid,
   a liquid pressure changing apparatus arranged fluidly adjacent the cold storage fluid heat exchanger opposite the vapour pressure changing apparatus, configured to change pressure of the working fluid in a liquid phase, and
   an inter storage heat exchanger arranged fluidly between the liquid pressure changing apparatus and the hot storage fluid heat exchanger, configured and arranged to exchange sensible heat of the working fluid with a storage fluid;
   a hot storage fluid flow path cycle passing through the hot storage fluid heat exchanger and a hot storage fluid tank storing the hot storage fluid;

a cold storage fluid flow path cycle passing through the cold storage fluid heat exchanger and a cold storage fluid tank storing the cold storage fluid; and an inter storage tank flow path cycle fluidly connecting the hot storage fluid tank to the cold storage fluid tank via the inter storage heat exchanger.

2. A method for generating electrical energy from thermal storage comprising the steps of:

evaporating a working fluid of a vapour-liquid cycle in a hot storage fluid heat exchanger against a hot storage fluid circulating through a cycle of the hot storage fluid heat exchanger and a hot storage fluid tank;

expanding the evaporated working fluid in a turbine of the vapour-liquid cycle to drive a generator to generate electricity;

condensing the expanded working fluid in a cold storage fluid heat exchanger against a cold storage fluid circulating through a cycle of the cold storage fluid heat exchanger and a cold storage fluid tank;

pressuring the condensed working fluid in a pump; and heating the pressured working fluid in an inter storage heat exchanger against a storage fluid passing from the hot storage fluid tank to the cold storage fluid tank.

3. A method for storing electrical energy as thermal energy comprising the steps of:

isenthalpically throttling a working fluid of a vapour-liquid cycle using a throttle valve;

evaporating the throttled working fluid in a cold storage fluid heat exchanger against a cold storage fluid circulating through the cold storage fluid heat exchanger and a cold storage fluid tank;

compressing the evaporated working fluid in a compressor driven by a motor thereby inputting electrical energy in the vapour-liquid cycle;

condensing the compressed working fluid in a hot storage fluid heat exchanger against a hot storage fluid circulating through the hot storage fluid heat exchanger and a hot storage fluid tank; and cooling the condensed working fluid in an inter storage heat exchanger against a storage fluid passing from the cold storage fluid tank to the hot storage fluid tank.

* * * * *